(No Model.)

G. THOMPSON.
BROACH.

No. 394,226. Patented Dec. 11, 1888.

Witnesses.
Walter E. Morrow.
Robert T. Morrow.

Inventor.
George Thompson.

UNITED STATES PATENT OFFICE.

GEORGE THOMPSON, OF CLEVELAND, OHIO.

BROACH.

SPECIFICATION forming part of Letters Patent No. 394,226, dated December 11, 1888.

Application filed May 26, 1888. Serial No. 275,212. (No model.)

*To all whom it may concern:*

Be it known that I, GEORGE THOMPSON, of the city of Cleveland, county of Cuyahoga, and State of Ohio, have invented a certain new and useful Improvement in Broaches, of which the following is a specification, reference being had to the accompanying drawings, forming part thereof.

This invention relates to an improved device intended for the operation of uniformly sizing the diameters of cylindrical holes in the manufacture of light machinery.

Figure 1:
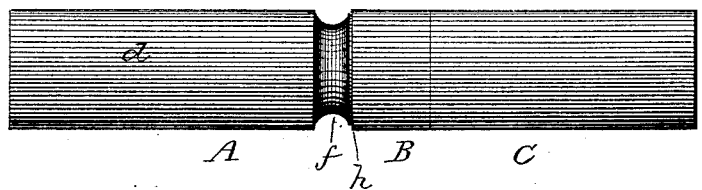
Figure 2:
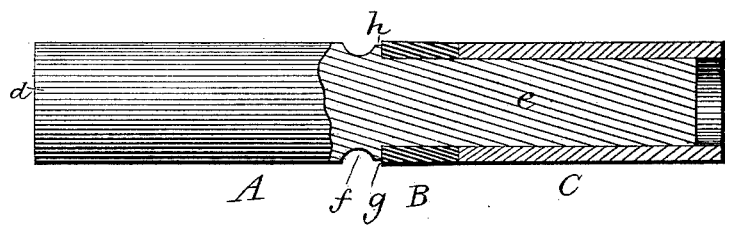

In the accompanying drawings, Figure 1 is a view of the device arranged in form for use. Fig. 2 is a view, partly in section, of the same, showing the inner diameter of ring B and of tube C, the smaller diameter of part A, and its comparative length with ring and tube combined.

It is generally understood that in the manufacture of small interchangeable parts of machinery, as of sewing-machines and work of a similar character, it is required for the object of uniformity that each part composing the same be made as far as practicable to conform to a gage. The shaft-holes of hand-wheels for sewing-machines and the holes in other parts of machinery of a similar character where their manufacture is of a duplicating nature are usually made to fit a gage. The usual way of enlarging the holes until the gage-size is attained is by the process of using reamers. The reamers are either made solid or made for expansion as they become worn. The latter is considered the most economical, but requires the most skill in their use.

The object of the present invention is to provide an improved device by which the said operation of giving a standard size to the diameters of the holes is more quickly and cheaply done than with the use of a reamer. Unlike the reaming process, this device gives the size of the hole by being forced through it by a press or other similar mechanism.

Part A is a pin of a cylindrical form, made of steel hardened and preferably ground true, having two diameters, $d$ and $e$, the annular recess $f$, and shoulder $g$.

B is a ring-shaped cutter, having an annular cutting-edge at face $h$, and is made to fit on the small diameter, $e$, of part A. The external diameter of this ring is made slightly tapering, so as to decrease in size from the cutting-edge, and leaving the diameter at the cutting-edge a little the largest. The width of this ring of itself is not an important point, but would be in good proportion if made to one-half or two-thirds of the size of its diameter.

C is a hardened-steel tube or sleeve, similar to cutter-ring B, with the exceptions of its being made longer and its diameter made parallel from end to end. Its diameter should be slightly less than that of the ring at its cutting-edge. It fits on and over the smaller part of A from the ring B to and overlapping the end.

Both ring B and tube C should fit part A closely, but is not needed to be so tight as to require anything but the hands to separate them.

The largest diameter, $d$, of part A should be a few thousandths of an inch smaller than the size which the holes are to be finished to, and to act as a pilot by fitting easily the hole before it is finished. The smaller diameter, $e$, should be of a suitable size consistent with its strength and that of the ring. In the present case it is about one-third less than the larger diameter.

The exact length of part A is immaterial, as in the present case it is satisfactory if it is about six times longer than the larger diameter. It is not necessary to be very exact at what point the shoulder $g$ should be at on the pin or part A; but about midway from each end, as in the present case, serves the purpose. The clearance for cuttings is provided for by the annular recess or groove $f$.

In putting the device together ready for use the cutting-ring B is placed on $e$ of part A, with its cutting-face against the shoulder $g$. The sleeve is then put on and backs against the cutter-ring.

In the operation of broaching, simply set the end $d$ in the hole to be finished and press the broach through, which gives the hole the ring size. When it is found after frequent use that the cutter has become dull, the cutter can be easily taken off and resharpened by simply grinding across the face $h$. The device, without altering its character, can be made to be used in a reverse manner by reversely placing the ring and having the tube made to act as the pilot and the large diameter of A made to conform to the size of the finished hole; but the way as is described is preferable. Also, the cutter-ring and the sleeve B can be made as one piece; but this form would add somewhat to the expense of making and renewing the cutters.

I am aware that an operation for sizing and giving shape to square and various shapes of holes other than cylindrical has been done before by broaching; but the broaches are usually a solid piece and made with a series of cutting-edges which are difficult, if not usually impracticable, to resharpen; hence a solid cylindrical broach made with a series of cutting-edges for the above reason would not be as satisfactory as the present reamer is for a cylindrical shape.

The main feature of distinction and advantage that my invention has over others for broaching is in making use of a single cutting-edge of a detachable ring that can be readily separated from the rest of the device for the purpose of resharpening by grinding across its face.

I claim—

1. In a broaching device for the purpose of sizing cylindrical-shaped holes, the combination of the ring-shaped cutter B and part A, as herein described.

2. In a broaching device for the purpose of sizing cylindrical-shaped holes, the combination of part A with the cutting-ring B and the sleeve C, substantially as described.

GEORGE THOMPSON.

Witnesses:
W. E. MORROW,
R. T. MORROW.